United States Patent [19]

Ecker

[11] 4,304,035

[45] Dec. 8, 1981

[54] TOOL FOR MOUNTING SPRING RETAINER PLATES ON VALVE STEMS

[76] Inventor: Lambert Ecker, Hindenburgstr. 13, D 7143 Vaihingen 2, Fed. Rep. of Germany

[21] Appl. No.: 130,048

[22] Filed: Mar. 13, 1980

[30] Foreign Application Priority Data

Mar. 14, 1979 [DE] Fed. Rep. of Germany ....... 2909984
Jan. 19, 1980 [DE] Fed. Rep. of Germany ....... 3001849

[51] Int. Cl.[3] ............ B23P 19/04

[52] U.S. Cl. ............ 29/249; 29/213 R

[58] Field of Search ............ 29/213 R, 213 A, 225, 29/229, 278, 280, 249

[56] References Cited

U.S. PATENT DOCUMENTS 2,517,583 8/1950 Lunda ............ 29/249
3,314,136 4/1967 Giles ............ 29/249
3,315,339 4/1967 Young ............ 29/249
3,793,999 2/1974 Seiler et al. ............ 29/249

*Primary Examiner*—James L. Jones, Jr.

[57] ABSTRACT

A tool for mounting a spring retainer plate on a valve stem with a locking member includes a tool shaft having a socket on one end thereof for cooperation with a spring retainer plate to push same over a valve stem. A yieldable pin extends outwardly of the shaft at its one end centrally of the socket for engaging an end of a valve stem. An abutment surface generally radially outwardly of the pin engages a locking member to move same axially over the end of a valve stem in following relationship to the spring retainer plate for cooperably locking onto the valve stem to hold the plate against displacement from the stem.

16 Claims, 7 Drawing Figures

TOOL FOR MOUNTING SPRING RETAINER PLATES ON VALVE STEMS

BACKGROUND OF THE INVENTION

This application pertains to the art of tools and, more particularly, to tools for mounting spring retainer plates on valve stems. The invention is particularly applicable to valves on internal combustion engines and will be particularly described with respect thereto. However, it will be appreciated that the invention has broader aspects and can be used for other purposes such as mounting spring retainer plates on air compressor valves.

Valves on internal combustion engines or the like conventionally have a coil spring surrounding the valve stem and acting against a spring retainer plate locked against displacement from the valve stem. The spring retainer plate is commonly held against displacement from the valve stem by a radially compressible locking member defined by a pair of wedge elements locked to the valve stem between its upper free end and the spring retainer plate.

In order to mount the plate on the valve stem with the locking member, it is necessary to overcome the considerable pressure of the valve coil spring. Therefore, mechanical aids are required for mounting the spring retainer plate.

With relatively flat spring retainer plates, it is often possible to set the spring retainer plate and the locking member on the valve stem, and then move them to the desired position by applying hammer blows to a sleeve member engaging the spring retainer plate. However, generally conical spring retainer plates used in overhead valve engines cannot be mounted in this manner and special mounting tools are required.

Regardless of whether the spring retainer plate is generally flat or generally conical, a certain amount of skill is required by the person mounting the spring retainer plate. Making a proper and secure connection of the spring retainer plate to the valve stem requires considerable time and skill.

It would be desirable to have a tool for mounting spring retainer plates to valve stems without requiring any special skill and without requiring a lot of time.

SUMMARY OF THE INVENTION

A tool for mounting a spring retainer plate on a valve stem with a locking member includes a tool shaft having a socket on one end thereof for cooperation with a spring retainer plate to push same over a valve stem. An axially movable pin is yieldably biased outwardly of the shaft at its one end centrally of the socket for engaging an end of a valve stem. An abutment surface generally radially outwardly of the pin engages a locking member to move same axially over the end of a valve stem in following relationship to the plate for cooperably locking onto the valve stem to hold the plate against displacement from the stem.

In a preferred arrangement, the socket is in a socket member removably attached to the shaft so that different sizes and shapes of sockets can readily be used.

In one arrangement, the abutment surface for engaging the locking member is on a sleeve member surrounding the pin. The sleeve is axially movable in the shaft and is yieldably biased outwardly.

In another arrangement, the abutment surface for engaging the locking member is defined by the bottom of the socket.

The socket may include opposite recesses adjacent the pin for receiving the pieces of a two-piece locking member. Opposite rods movable laterally of the shaft axis into the recess engage the pieces of the locking member for radially compressing same into locking engagement with the valve stem. The rods are preferably yieldably biased into the recesses, and pivoted levers are provided for moving the rods out of the recesses.

The tool may be mounted on a guide frame for adjustment in directions parallel and perpendicular to the shaft axis, and for varying the inclination of the shaft axis.

It is a principal object of the present invention to provide an improved tool for mounting spring retainer plates on valve stems.

It is an additional object of the invention to provide such a tool which can be used without requiring any skill by the operator.

It is also an object of the invention to provide such a tool which can readily be modified for use with spring retainer plates of different sizes and shapes.

DESCRIPTION OF PREFERRED EMBODIMENTS

Figure 1:
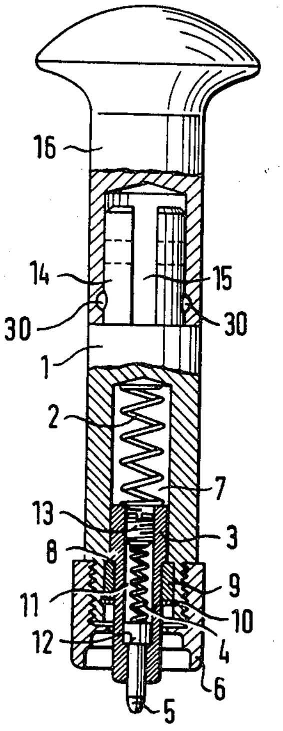
FIG. 1 is a side elevational view of a tool constructed in accordance with the present invention, and with portions cut-away and in section for clarity of illustration.
Figure 2:
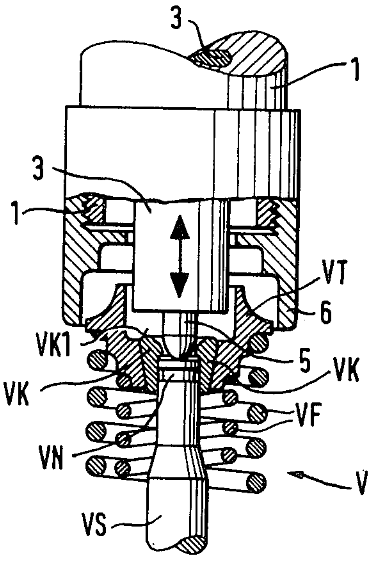
FIG. 2 is a side elevational view of the working end of the tool in FIG. 1 cooperating with a spring retainer plate, with portions cut-away and in section for clarity of illustration.

With reference to the drawing, and particularly FIGS. 1 and 2, a tool includes a generally cylindrical shaft 1 having a coaxial bore 7 therein slidably receiving a pin member in the form of a sleeve member 3. The sleeve member 3 has a large diameter upper end portion slidably received in the bore 7 and intersects a smaller diameter lower end portion at a circumferential shoulder 8 which cooperates with a stop ring 9 held in a larger diameter lower end portion of the bore 7 by a snap ring 10. The sleeve member 3 is normally biased axially outwardly of one end of the tool shaft 1 by a coil spring 2 positioned within the bore 7.

The sleeve member 3 has a cylindrical bore 11 therein which includes a large diameter upper bore portion slidably receiving a large diameter upper end portion of a pin 5. A smaller diameter lower end portion of the pin 5 extends through a smaller diameter portion of the bore 11. The large and small diameter portions of the bore 11, and the large and small diameter portions of the pin 5, intersect at shoulders to provide cooperating stops generally indicated at 12 for preventing complete outward displacement of the pin 5. A coil spring 4 positioned in the bore 11 acts against the upper end of the pin 5 for normally yieldably biasing same outwardly. The force of the spring 4 is adjustable by an adjustment means in the form of a screw member 13 threaded into the upper end of the bore 11.

A socket member 6 is removably attached to the one end of the tool shaft 1 in any suitable manner. In the arrangement shown, the socket member 6 is threaded onto the one end of the tool shaft 1. The socket member 6 has a recessed socket therein which opens axially outwardly of the tool shaft 1. The bottom wall of the socket has a central hole therethrough and the sleeve member 3 projects through that hole into the socket. The outer ends of both the sleeve member 3 and the pin 5 are preferably biased outwardly to positions beyond the free end of the socket member 6, with the end of the pin 5 located well beyond the end of the sleeve member 3.

The upper end of the tool shaft 1 has a smaller diameter portion 14 with an axially extending slot 15 thereacross to provide a bifurcated upper end portion. The slot 15 may receive an operating lever when the tool is used with a guide frame, or a handle 16 may be received over the upper end portion 14 in any suitable manner, as by providing spherical circumferential notches 30 in either the handle 16 or the end portion 14 for cooperating with a snap ring or the like on the other member.

FIG. 2 shows a valve stem V of a valve on an internal combustion engine or the like. The valve stem V has a locking means in the form of a circumferential groove VN adjacent the upper end thereof. A spring retainer plate VT has a central hole therethrough for positioning the plate over the valve stem V to compress the coil springs VF surrounding the valve stem V. The central hole through the spring retainer plate VT is tapered so it has a larger diameter at its upper end than at its lower end. In other words, the hole is generally in the shape of an inverted truncated cone. A radially compressible locking member VK has an outer peripheral surface generally corresponding to the shape of the central hole through the spring retainer plate VT. The locking member VK is in two pieces which have inwardly extending upper beads VK1 for reception in the locking means defined by the valve stem circumferential groove VN. The diameter of the pin 5 is approximately the same as the diameter of the opening within the beads VK1 before they move into the groove VN.

The locking member VK is positioned in the hole in the spring retainer plate VT and this assembly is positioned in engagement with the upper end of the spring VF in alignment with the upper end portion of the valve stem V as shown in FIG. 2. The tool is positioned as shown in FIG. 2 with the pin 5 extending through the locking member VK into engagement with the upper end of the valve stem V for guiding the tool. The socket receives the spring retainer plate VT and the outer peripheral surface of the socket member engages the upper outer surface of the plate VT. An axial downward force is then applied to the tool shaft 1 for pushing the spring retainer plate VT over the valve stem V. During this movement, the pin 5 retracts within the bore 11 in the sleeve member 3 until the bottom end of the sleeve member 3 engages the upper end of the locking member VK. Continued pushing movement on the plate VT for moving same further onto the valve stem V allows the parts of the locking member VK to radially separate sufficiently to allow the beads VK1 to pass down over the upper end portion of the valve stem V. The sleeve member 3 pushes the locking member VK down over the valve stem until the beads VK1 are received in the groove VN. When the tool is then lifted from engagement with the plate VT, the springs VF cause the cooperating tapered surfaces of the hole in the plate and on the locking member to engage one another for securely holding the beads VK1 in the groove VN.

In the arrangement of FIGS. 1 and 2, the bottom end of the sleeve member 3 may be considered an abutment surface which is located generally radially outwardly of the pin 5 in surrounding relationship thereto for engaging the locking member VK to push same down over the valve stem V. The sleeve member 3 can also be considered an engagement means which engages the locking member VK to cooperate with same in properly positioning same over the valve stem. The pin 5 is retracted to a position in which it does not project outwardly of the abutment surface defined by the bottom end of the sleeve member 3. In this position of the pin 5, the locking member VK begins moving down over the valve stem. The small diameter portion of the bore 11 in the sleeve member 3 is large enough to receive the upper end portion of the valve stem V. The socket member 6, along with the sleeve member 3 and pin 5, are readily replaceable so the tool can be used with valve assemblies of different sizes and shapes. The cooperating tapered surfaces on the locking member VK and the hole in the spring retainer plate VT define compression means for generally radially compressing the locking member VK into locking engagement with the locking means VN on the valve stem V. During assembly, the locking member VK is located between the upper end of the valve stem V and the spring retainer plate VT, and follows the plate VT as it is pushed downwardly over the valve stem V.

Figure 4:
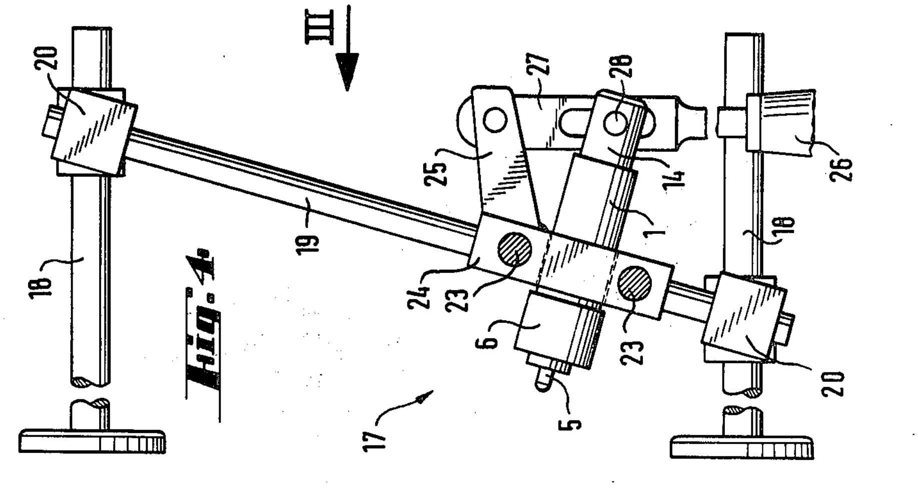
FIG. 4 is a side elevational view showing the guide frame of FIG. 3.
Figure 3:
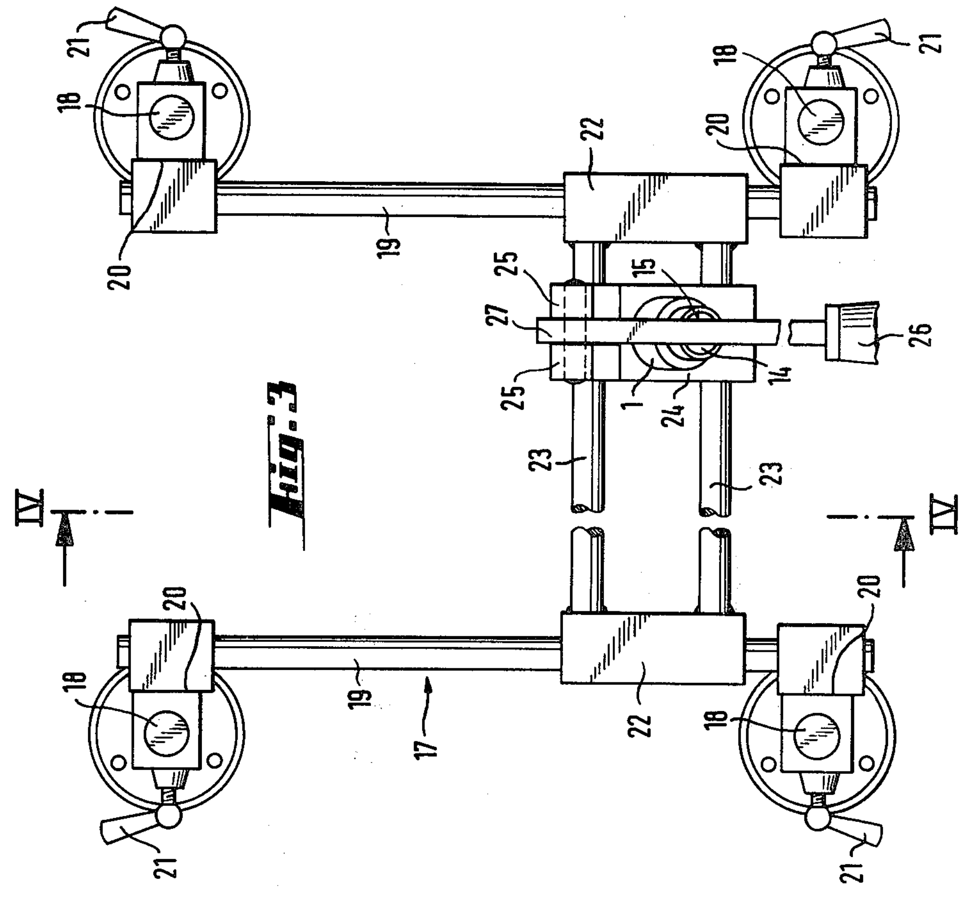
FIG. 3 is a top plan view showing a guide frame on which the tool is mounted.

The tool may be used with guide frame means 17 as shown in FIGS. 3 and 4. The guide frame includes parallel upright columns 18 located at the corners of a rectangle and having bottom flanges for attachment to a work table or the like. Column slide members 20 are longitudinally adjustable along the columns 18 by operation of clamp screws 21. A pair of elongated beam members 19 are provided, and each has its opposite ends attached to a different pair of column slide members 20. Beam slide members 22 are longitudinally adjustable along the beam members 19. Parallel tool slide supports 23 are connected between the beam slide members 22. A tool slide member 24 is longitudinally adjustable along the tool slide supports 23 and receives the tool shaft 1 for longitudinal movement therethrough. The tool slide member 24 has a support 25 to which an operating lever 27 is pivotally connected. The lever 27 is flat and is received in the slot 15 of FIG. 1 in the upper end portion 14 of the shaft 1. The lever 27 has an elongated slot receiving a pin 28 extending through the upper end portion 14 of the tool shaft 1. A handle 26 is connected with the lever 27. The guide frame arrangement described makes it possible to use the tool with V-shaped cylinder heads wherein the valve stems are inclined to the vertical. Movement of the column slide members 20 adjusts the elevation of the tool and also makes it possible to vary the inclination of the tool longitudinal axis. For this purpose, the opposite ends of the beam members 19 may be longitudinally adjustable in the column slide members 20 by suitable clamp screws. Thus, movement of the slide members 20 makes it possible to adjust the position of the tool parallel to its axis and to also vary the inclination of its axis. Movement of the slide members 22 along the beam members 19 adjusts the tool in one direction perpendicular to its longitudinal axis. Movement of the tool slide member 24 along the tool slide supports 23 adjusts the tool in another direction perpendicular to its longitudinal axis and to the first adjustment direction. Operation of the handle 26 and lever 27 moves the tool shaft 1 longitudinally relative to the tool slide member 24.

Figure 5:
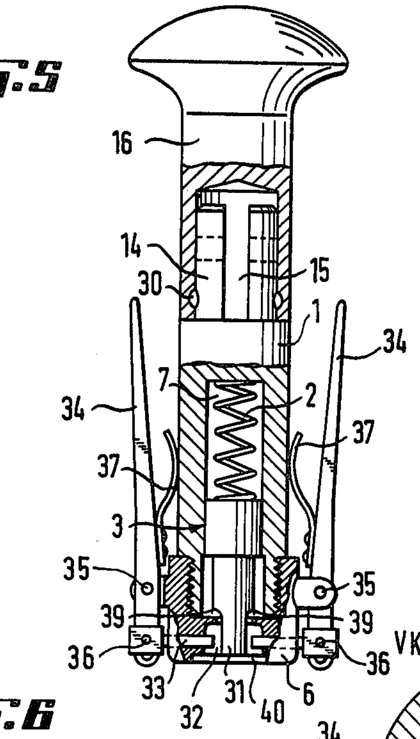
FIG. 5 is a side elevational view of another embodiment, with portions cut-away and in section for clarity of illustration.
Figure 7:
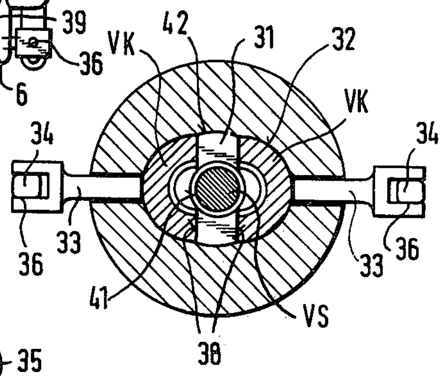
FIG. 7 is a bottom plan view taken generally on line VII—VII of FIG. 6.
Figure 6:
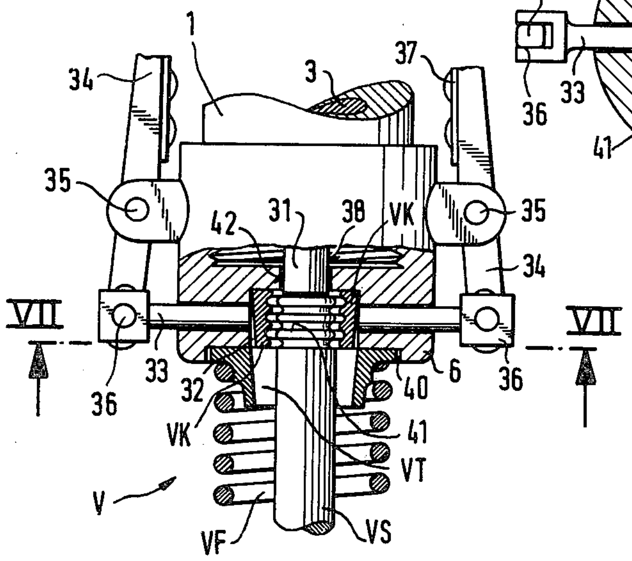
FIG. 6 is a side elevational view of the working end of the tool in FIG. 5 cooperating with a valve spring retainer plate, with portions cut-away and in section for clarity of illustration.

The embodiment of FIGS. 5–7 is particularly advantageous for use with relatively flat spring retainer plates. The tool includes a generally cylindrical shaft 1 having an upper end portion 14 with an axial slot 15 and a handle 16 may be mounted thereon as in the embodiment of FIGS. 1, 2. A coaxial bore 7 in the tool shaft 1 slidably receives a pin member 3 which is normally biased outwardly by a coil spring 2 positioned in the bore 7. The pin member 3 has a lower end portion 31 with opposite longitudinally extending parallel flat surfaces or areas 38 formed thereon. The intersections of the flat areas with the cylindrical portion of the pin member 3 provide downwardly facing shoulders 39.

A socket member 6 is removably attached to the lower end portion of the tool shaft 1 and has a central hole 42 therein through which the lower end portion 31 of the pin member 3 projects. The hole 42 has a cross-sectional shape generally corresponding to the cross-sectional shape of the pin member lower end portion 31. The shoulders 39 cooperate with the peripheral portions of the hole 42 to prevent complete displacement of the pin member 3 from the tool shaft 1.

Opposite recesses 32 define recess means and are provided in the socket member 6 radially outwardly of the flat areas 38 on the pin lower end portion 31. The pin member 3 is normally biased outwardly by the spring 2 so that the lower end portion 31 thereof extends substantially completely through the recesses 32.

Pieces VK of a two-piece radially compressible locking member are receivable in the recesses 32. The ends of the pieces VK engage the flat areas 38 on the pin member lower end portion 31 and fit snugly enough in the recesses 32 for being retained therein.

The socket member 6 has a generally cylindrical socket 40 therein for receiving spring retainer plate VT having a central hole therethrough in the shape of an inverted truncated cone. When the two pieces of the locking member are moved radially into engagement with one another, the outer surface thereof generally corresponds to the shape of the hole through the spring retainer plate VT.

Valve stem VS has locking means in the form of circumferential grooves 41 adjacent the upper end thereof for cooperation with inwardly extending circumferential beads within the locking member pieces VK. A coil spring VF surrounds the valve stem VS.

Opposite rods 33 project slidably through suitable bores in the socket member 6 extending laterally of the tool shaft longitudinal axis. In the arrangement shown, the rods 33 extend substantially perpendicular to the tool shaft longitudinal axis. Levers 34 pivotally connected to ears 35 on the socket member 6 are also pivotally connected at 36 to the rods 33. Elongated slots are provided in the levers 33 at the pin connections thereof to the rods 33 at 36. Leaf springs 37 are secured to the levers 34 and normally act against the tool shaft 1 for pivoting the levers 34 outwardly away from the shaft 1 so the rods 33 move inwardly toward the shaft axis. The rods 33 are aligned with the recesses 32 for movement into same for radially compressing the locking pieces VK. Manual squeezing of the levers 34 toward the shaft 1 moves the rods 33 out of the recesses 32 and in a direction outwardly of the shaft longitudinal axis.

In the arrangement of FIGS. 5–7, the locking members VK are positioned in the recesses 32 while the levers 34 are squeezed toward the shaft 1. A spring retainer plate VT is then positioned on the spring VF in alignment with the valve stem VS. The tool is then positioned as shown in FIG. 6 with the plate VT received in the socket 40. Axial force applied to the shaft 1 pushes the plate VT down over the valve stem. The bottom end of the pin member 3 engages the upper end of the valve stem and the pin member 3 is retracted as the pushing movement progresses. The bottoms of the recesses 32 may be considered abutment surfaces which engage the upper ends of the locking member pieces VK to move same down over the valve stem VS. Such abutment surfaces correspond in function with the abutment surface defined by the bottom end of the sleeve member 3 in the embodiment of FIGS. 1 and 2. When the bottom end of the pin member 3 no longer projects outwardly of the abutment surface defined by the recess bottoms, the upper end of the valve stem engages the abutment surfaces and the locking means defined by the grooves 41 is aligned with the locking member pieces VK. Releasing the levers 34 then causes the springs 37 to move the rods 33 into the recesses 32 for compressing the locking member pieces VK radially into locking engagement with the locking means 41. When the tool is lifted, the cooperating compression means defined by the tapering surfaces on the locking members VK and the hole in the plate VT hold the locking members VK to the stem VS for preventing displacement of the plate VT from the stem under the force of the spring VF. The surfaces of the recesses 32, along with the flat areas 38 on the pin member lower end portion 31, may be considered engagement means which cooperates with the locking member pieces VK to move same over the valve stem into longitudinal alignment with the stem locking means. The pin 5 of FIGS. 1, 2 operates in essentially the same manner as the pin member 3 in FIGS. 5–7 as both pins are progressively retracted to assist in positioning the locking member in longitudinal alignment with the valve stem locking means as the spring retainer plate is pushed over the valve stem. Obviously, the embodiment of FIGS. 5–7 can also be used with the guide frame means 17 of FIGS. 3 and 4.

In the embodiment of FIGS. 5–7, the compression means for generally radially compressing the locking member into locking engagement with the valve stem is defined by the rods 33.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

What is claimed is:

1. A tool for mounting a spring retainer plate on a valve stem with a locking member comprising: a tool shaft having a socket on one end thereof for cooperation with a spring retainer plate to push same over a valve stem, a pin extending outwardly of said shaft at one end centrally of said socket for engaging an end of a valve stem, pin biasing means for yieldably biasing said pin outwardly of said one end, an abutment surface outwardly of said pin for engaging a locking member to move same axially over the end of a valve stem in following relationship to the plate for cooperably locking onto the valve stem to hold the plate against displacement from the stem; the spring retainer plate being held against displacement from the valve stem by a radially compressible locking member, said socket having enlarged recess means therein through which said pin extends for receiving a radially compressible locking member radially outwardly of said pin; and compression means movable generally radially into said recess means for compressing a locking member generally radially inwardly when said pin is axially retracted from said recess means.

2. The tool of claim 1 wherein said socket is in a socket member removably attached to said shaft.

3. The tool of claim 1 wherein said abutment surface is on a sleeve member surrounding said pin, said sleeve being axially slidable in said shaft, and sleeve biasing means for biasing said sleeve outwardly of said one end of said shaft.

4. The tool of claim 3 wherein said pin is axially slidable in said sleeve, and adjustment means carried by said sleeve for adjusting the force of said pin biasing means.

5. The tool of claim 1 wherein said abutment surface is defined by the bottom of said socket.

6. The tool of claim 1 wherein said pin is generally cylindrical and has a large diameter inner end intersecting a small diameter outer end at a shoulder, said large diameter inner end being axially slidable in a bore, and a removable stop in said bore cooperating with said shoulder for preventing complete outward displacement of said pin from said bore under the force of said pin biasing means.

7. The tool of claim 1 wherein said pin has an outer pin end and is normally biased axially outwardly by said pin biasing means to a position in which said pin is spaced a substantial distance outwardly of said abutment surface, and said pin being axially retractable to a position in which said pin end does not project outwardly of said abutment surface.

8. The tool of claim 1 wherein said pin has opposite flats thereon on the outer portion thereof extending through said recess means.

9. The tool of claim 1 wherein said compression means comprises axially movable opposite rods extending generally radially of the axis of said shaft into said recess means.

10. The tool of claim 9 including rod biasing means for normally biasing said rods inwardly toward the axis of said shaft, and manually squeezable levers connected with said rods and being pivotally connected to said shaft for swinging movement toward the axis of said shaft to move said rods outwardly of the axis of said shaft.

11. The tool of claim 1 wherein the end portion of said shaft opposite from said socket is bifurcated.

12. The tool of claim 1 including guide frame means on which said tool is mounted for adjustment in directions parallel and perpendicular to the axis of said shaft and for varying the inclination of the axis of said shaft.

13. The tool of claim 12 wherein said guide frame means includes four columns located at the corners of a rectangle, a column slide member adjustable longitudinally along each said column, a pair of beam members each having opposite ends connected to a different pair of said column slide members, beam slide members adjustable longitudinally along each said beam, a tool slide support spanning said beam slide members, a tool slide member adjustable along said tool slide support between said beam slides, said tool being mounted on said tool slide for movement therethrough parallel to the axis of said tool shaft, and handle lever means for longitudinally moving said tool.

14. A tool for mounting a spring retainer plate on a valve stem with a locking member comprising: a shaft having a socket member removably attached to one end thereof, said socket member having an axially outwardly opening socket for cooperation with a spring retainer plate to push same over a valve stem when an axial force is applied to said shaft, an axially movable pin mounted in said shaft and projecting outwardly centrally into said socket, yieldable pin biasing means for normally biasing said pin outwardly into said socket, opposite recesses adjacent said pin for receiving cooperable locking members, and opposite rods movable laterally of the axis of said shaft into said recesses, whereby when said shaft is moved axially to push a spring retainer plate over a valve stem said pin engages the end of the valve stem and is progressively retracted as the locking members are moved over the valve stem until the pin is completely retracted from between the locking members whereupon inward movement of said rods compresses the locking members into locking engagement with the valve stem to hold the spring retainer plate against displacement therefrom.

15. The tool of claim 14 wherein said pin has opposite longitudinal flat areas facing said recesses.

16. The tool of claim 14 including rod biasing means for normally biasing said rods into said recesses, and pivoted levers connected with said rods for moving same out of said recesses.

* * * * *